United States Patent [19]

Sainen

[11] Patent Number: 5,155,691
[45] Date of Patent: Oct. 13, 1992

[54] METHOD FOR CONTROLLING ROTATIONAL FREQUENCY OF WEAVING MACHINE AND APPARATUS THEREFOR

[75] Inventor: Tsutomu Sainen, Kanazawa, Japan
[73] Assignee: Tsudakoma Kogyo Kabushiki Kaisha, Ishikawa, Japan
[21] Appl. No.: 534,172
[22] Filed: Jun. 5, 1990
[30] Foreign Application Priority Data
  Jun. 12, 1989 [JP] Japan ............ 1-146661
[51] Int. Cl.⁵ ............ G06F 15/46
[52] U.S. Cl. ............ 364/470; 364/166; 395/61
[58] Field of Search ............ 364/470, 148, 166; 395/61

[56] References Cited
U.S. PATENT DOCUMENTS

| | | | |
|---|---|---|---|
| 4,736,324 | 4/1988 | Sainen | 364/470 |
| 4,835,699 | 5/1989 | Mallard | 364/470 |
| 4,943,927 | 7/1990 | Yarita et al. | 364/470 |

Primary Examiner—Robert W. Beausoliel
Assistant Examiner—Allen M. Lo
Attorney, Agent, or Firm—Graybeal Jackson Haley & Johnson

[57] ABSTRACT

A control method for the rotational frequency of a weaving machine comprises the steps of performing a plurality of times of trial runnings of the weaving machine at different trial rotational frequencies to obtain the operating time for each rotational frequency, obtaining at least one indefinite coefficient in the formula representing the relation between a rotational frequency factor and an operating time factor by utilizing each obtained operating time and each trial rotational frequency, obtaining the optimum rotational frequency, at which the quantity of production reaches the maximum, on the basis of the obtained at least one indefinite coefficient and fuzzy inference, and controlling the rotational frequency of the weaving machine into the obtained optimum rotational frequency.

8 Claims, 10 Drawing Sheets

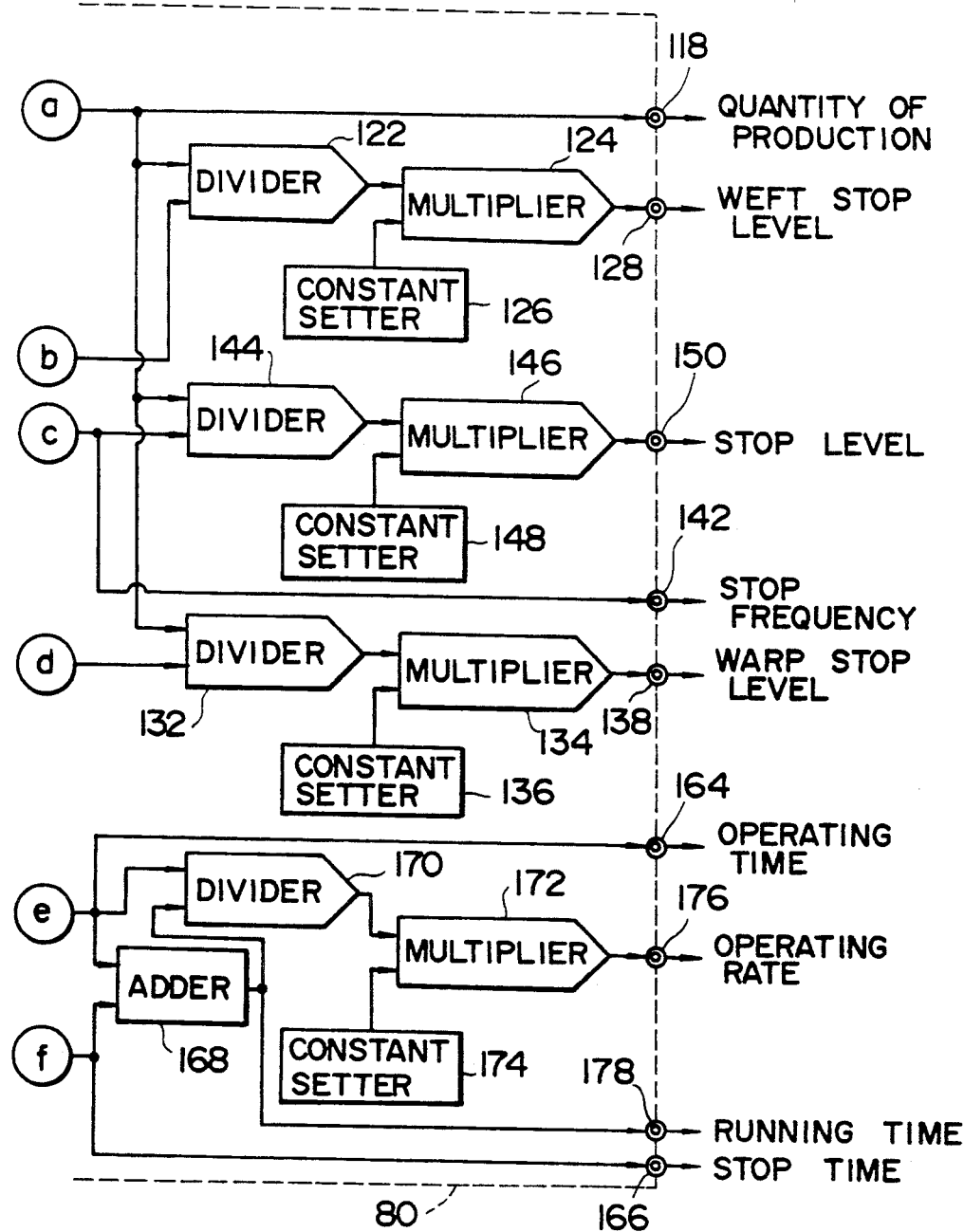

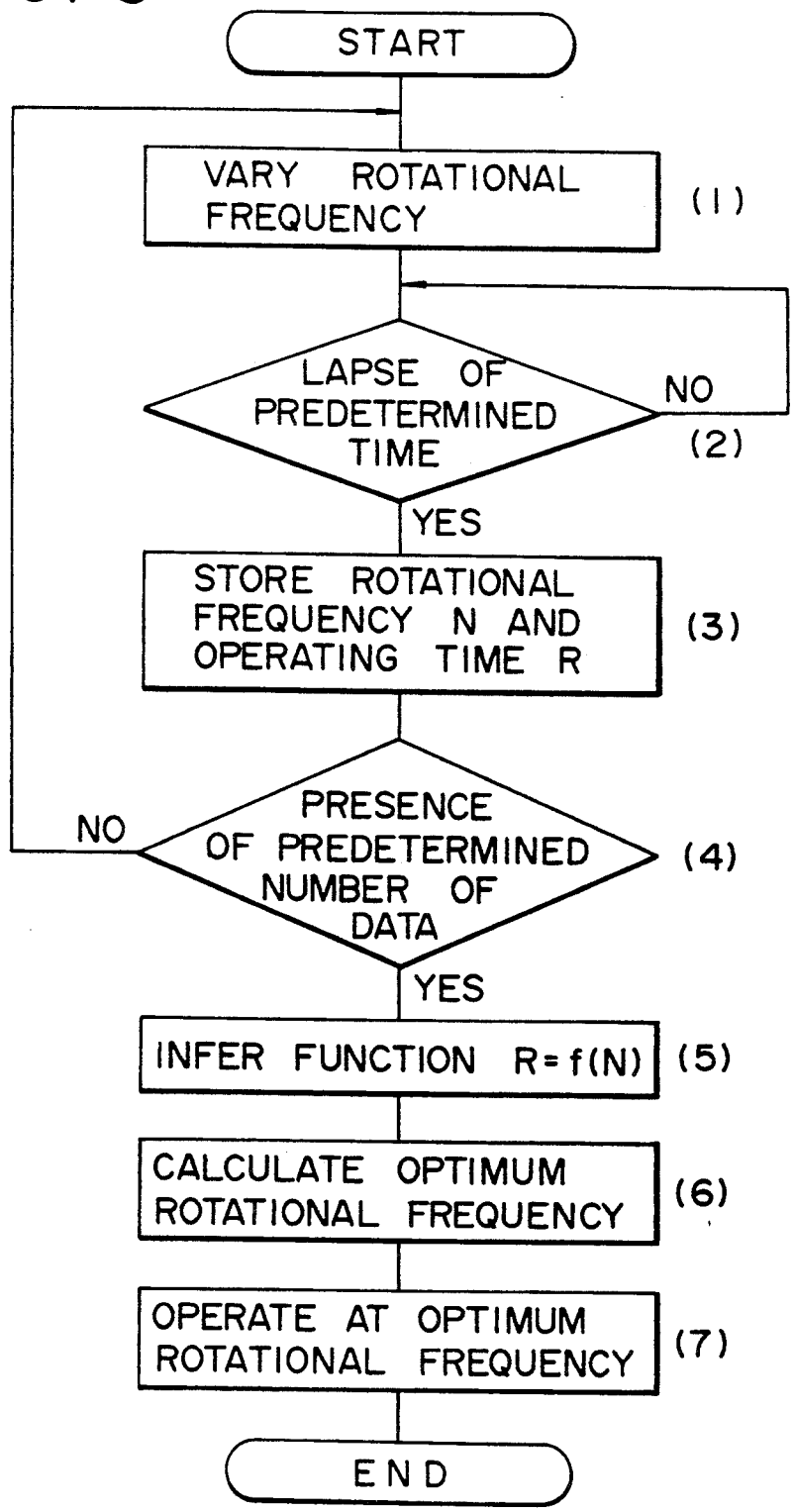

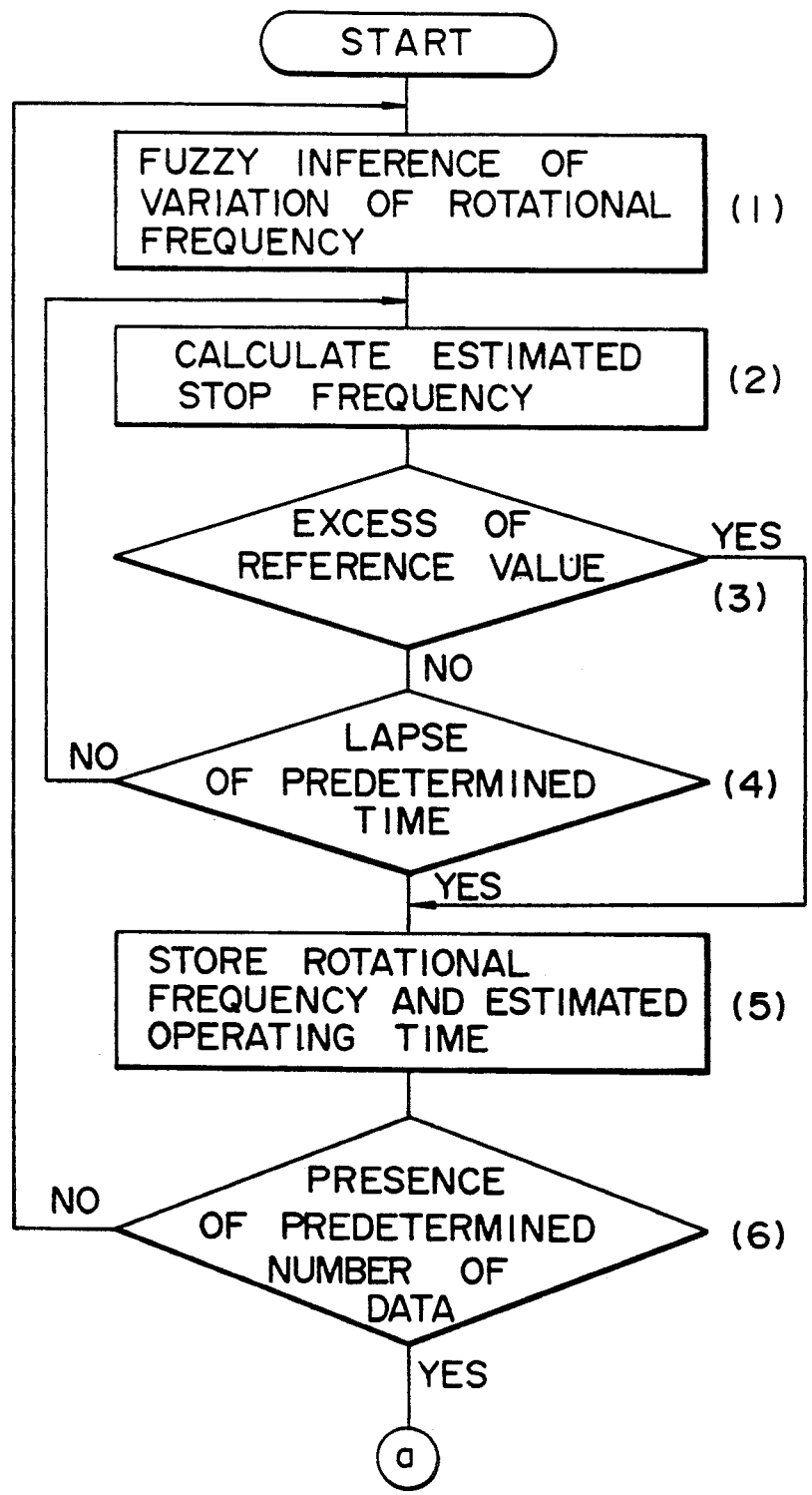

METHOD FOR CONTROLLING ROTATIONAL FREQUENCY OF WEAVING MACHINE AND APPARATUS THEREFOR

BACKGROUND OF THE INVENTION

1. Field of the Invention

This invention relates to a method for controlling the rotational frequency of a weaving machine and an apparatus therefor and, more particularly, to a method for controlling the rotational frequency of a weaving machine so as to increase the quantity of production and an apparatus therefor.

2. Description of the Prior Art

In a weaving machine, the rotational frequency to maximize the quantity of production depends upon not only the kind of weaving machine and resultant woven fabric, but also upon the skill of an operator and the tolerance limit of the quality of woven fabric or the like. Thus, in the weaving machine, there is a case where the quantity of production is reduced by increasing the rotational frequency while there is another case where the quantity of production is increased by reducing the rotational frequency.

The above cases take place for the reason that since end breakage of warp and unsatisfactory weft insertion are liable to occur by increasing the rotational frequency, the number of times of stop, or the stop frequency, of the weaving machine caused by the end breakage of warp and unsatisfactory weft insertion is increased. When the stop frequency of the weaving machine is increased, the working allowance of the operator and the operating rate of the weaving machine are reduced, thus resulting in the further reduction in quantity of production than before the rotational frequency is increased, and besides, the degradation in quality of woven fabric occurs.

As one of weaving machine control methods which permit the quantity of production to increase by controlling the rotational frequency of a weaving machine, Japanese Patent Public Disclosure (KOKAI) No. 61-239057 (U.S. Pat. No. 4,736,324, EP-A-0182382) has disclosed a method of increasing the rotational frequency of a weaving machine when an allowance is made for the operating rate of the weaving machine.

According to this conventional control method, however, since the rotational frequency is determined on the basis of the operating rate resulting from varying the rotational frequency, the weaving machine is subjected to repetition of a series of steps, i.e., the increase in the operating rate, the increase of the rotational frequency, the increase in the stop frequency, the reduction in the operating rate, the reduction in the rotational frequency, the reduction in the stop frequency, the increase in the operating rate and the increase in the rotational frequency, for example. Therefore, in the conventional control method, the rotational frequency should be temporarily reduced, so that the increase in the final quantity of production is small.

SUMMARY OF THE INVENTION

It is an object of the present invention to provide a method for controlling a weaving machine and an apparatus therefor, which permit the operation of the weaving machine at the so-called optimum rotational frequency, at which the quantity of production per unit time reaches the maximum.

A method for controlling the rotational frequency of a weaving machine according to the present invention comprises the steps of performing a plurality of trial runnings of the weaving machine at different trial rotational frequencies to obtain the operating time for each rotational frequency, obtaining the indefinite coefficients in the formula representing the relation between an operating time factor and a rotational frequency factor by utilizing each obtained operating time and each trial rotational frequency, then obtaining the optimum rotational frequency, at which the quantity of production reaches the maximum, by utilizing the obtained indefinite coefficients, and thereby controlling the rotational frequency of the weaving machine into the obtained optimum rotational frequency.

An apparatus for controlling the rotational frequency of a weaving machine according to the present invention comprises control means for controlling the weaving machine to perform a plurality of trial runnings at different trial rotational frequencies, and operating means for obtaining the operating time for each trial rotational frequency, for obtaining the indefinite coefficients in the formula representing the relation between a rotational frequency factor and an operating time factor by utilizing each obtained operating time and each trial rotational frequency, and for obtaining the optimum rotational frequency, at which the quantity of production reaches the maximum, by utilizing the obtained indefinite coefficients, wherein the control means further controls the rotational frequency of the weaving machine into the obtained optimum rotational frequency.

In a textile factory, the quantity of production P (Pick) of woven fabric per one shift, the rotational frequency N (rpm) of the weaving machine and the operating time R (min.) are generally expressed as follows:

$$P = N \cdot R \qquad (1)$$

$$R = T_0 - \sum_{s=1}^{n} \tau s \qquad (2)$$

In formulas (1) and (2), $T_0$ represents the unit time, i.e., shift time (min.) which is usually well known. Also, n represents the number of times of stop of the weaving machine, or the total stop frequency. Further, $\tau s$ represents the stop time (min.) at the S-th stop of the weaving machine and is defined as the sum of the weaver waiting time (Ws) at the S-th stop and the repair time (Vs) at the S-th stop.

Here, the weaver waiting time means a period of time from the time when the weaving machine is stopped to the time when the weaver comes to repair this stopped weaving machine. Further, the repair time means the time occupied for the repair by the weaver. The operating time R is defined as the sum of the time in which the fabric is actually woven.

Since the operating time R is obtained from the formula (1) as follows:

$$R = P/N \qquad (3),$$

the relationship among P, N and R can be expressed by a plurality of hyperbolas (six hyperbolas are shown in FIG. 1) $P_1$ through $P_6$ as shown in FIG. 1 with the quantity of production P as a parameter. The relationship in quantity of production is as follows:

$P_1 > P_2 > P_3 > P_4 > P_5 > P_6$

In general, if the rotational frequency is increased, the total stop frequency is increased to thereby reduce the operating time. Thus, if the formula representing the relation between the rotational frequency N and the operating time R can be represented by a line $L_R$ shown in FIG. 1, the optimum rotational frequency, at which the quantity of production reaches the maximum, can be obtained, or computed, by utilizing the formula representing the line $L_R$ and the formula (1) representing the hyperbola.

In case of FIG. 1, out of the six hyperbolas, the curves satisfying the formula representing the line $L_R$ and the formula representing the hyperbola at the same time are the curves $P_3$ through $P_6$ which are in contact with the line $L_R$ or cross the line $L_R$, the curve corresponding to the maximum quantity of production is the hyperbola $P_3$ in contact with the line $L_R$, and the co-ordinates of the point of contact $A_0$ of the line $L_R$ with the hyperbola $P_3$ results in the operating time $R_0$ corresponding to the maximum quantity of production and the rotational frequency $N_0$ corresponding to the optimum rotational frequency.

Thus, if the relationship between the rotational frequency N and the operating time R can be known, the objective optimum rotational frequency can be obtained as the rotational frequency corresponding to the point of contact of both the curve and the line $L_R$.

However, since n, $\tau$s, Ws and Vs or the like as noted above vary depending upon not only the kind of the weaving machine and the resultant woven fabric, but also upon the skill of the operator and the tolerance limit of the quality of woven fabric or the like, it is unobvious what kind of straight line or curve the line $L_R$ representing the relation between the rotational frequency factor and the operating time factor is. Thus, it is unobvious what the function $R = f(N)$ representing the relation between the rotational frequency factor and the operating time factor is, that is, what the formula representing the relation between the rotational frequency factor and the operating time factor is.

On the other hand, since it is apparent from the formula (2) that the total stop time of the weaving machine is increased in proportion to the rotational frequency, the relation between the total stop time and the rotational frequency N can be expressed as being approximated by a straight line $L_T$, as shown in FIG. 1. In FIG. 1, the ordinate of the straight line $L_T$ represents the total stop time.

Therefore, the straight line $L_T$ representing the total stop time $$\sum_{s=1}^{n} \tau s$$

is linearly approximated to the following formula (4)

$$\sum_{s=1}^{n} \tau s \approx aN + b \qquad (4)$$

by using the indefinite coefficients "a" and "b", and the formula (4) is substituted for the formula (2), so that the line $L_R$ representing the relation between the rotational frequency N and the operating time R can be expressed by the following formula (5):

$$R = T_0 - aN - b \qquad (5)$$

The following formula (6) can be obtained by substituting the formula (5) for the formula (1).

$$aN^2 - (T_0 - b)N + P = 0 \qquad (6)$$

A solution of the formula (6) is as follows:

$$N = \{(T_0 - b) \pm \sqrt{(T_0 - b)^2 - 4aP}\}/2a$$

Since, as mentioned above, the maximum quantity of production is the value of P at the time when the straight line of the formula (5) is in contact with the curve, that is, when N of the formula (6) has multiple roots, a solution of the discriminant (7) of the formula (6), $$(T_0 - b)^2 - 4aP = 0 \qquad (7)$$

that is, $$P = (T_0 - b)^2/4a \qquad (8)$$

results in the maximum quantity of production, and the rotational frequency N expressed by the following formula (9), that is, $$N = (T_0 - b)/2a \qquad (9)$$

results in the optimum rotational frequency.

Therefore, according to the present invention, a plurality of pairs of operating time factors and rotational frequency factors are obtained by a plurality of the trial runnings, then the indefinite coefficients "a" and "b" are obtained by using the obtained operating time factors and the obtained rotational frequency factors, and thereafter the optimum rotational frequency is obtained by using the obtained indefinite coefficients "a" and "b". Also, since shift time $T_0$ is well known, the indefinite coefficients "a" and "b" can be obtained by solving the simultaneous equations which are obtained by substituting each operating time factor and each rotational frequency factor into the formula (5), for example, or by means of regression analysis such as a least square method. Further, the optimum rotational frequency can be obtained by substituting the obtained indefinite coefficients "a" and "b" into the formula (9).

While heretofore the present invention has been explained as applicable to the case where the function representing the relation between the rotational frequency and the operating time, and the total stop time are expressed by the straight line, the present invention may be applied to the case where the total stop time can be expressed by the curve as follows:

$$\sum_{s=1}^{n} \tau s = aN^2 + bN + c$$

According to the present invention, since the indefinite coefficients "a" and "b" in the unsettled formula, or the line $L_R$, representing the relation between the rotational frequency factor and the operating time factor, are obtained by using each trial rotational frequency and each operating time obtained through a plurality of trial runnings of the weaving machine, the weaving machine is operated at the optimum rotational frequency which has been conventionally incapable of being obtained, so that the quantity of production per unit time reaches the maximum.

Preferably, at least one of the trial rotational frequencies is determined by the utilizing fuzzy inference in the trial running. By so doing, the rotational frequency in the trial running results in a value close to the optimum rotational frequency, and besides, the operating time according to the rotational frequency close to the optimum rotational frequency is obtained, so that the certainty of the obtained optimum rotational frequency and that of the obtained indefinite coefficients are improved.

Preferably, each operating time is estimated after the trial running for a predetermined period of time shorter than the unit time. The longer the trial running time is, the more improved the certainty of the obtained operating time in the trial running and that of the obtained optimum rotational frequency are. However, if the trial running time is long, a great quantity of woven fabric is produced during the trial running, so that the quantity of production is not increased so much. On the other hand, if the operating time per unit time is estimated on the basis of the operating time in the trial running, the obtained result is substantially similar to that obtained in the case where the trial running time is made long, though the actual trial running time is short, so that the quantity of production is increased.

Preferably, each trial running of a plurality of weaving machines is simultaneously performed for the product of weaving the same scaled product to obtain the operating time for each trial running and the number of the machines as the total operating time of a plurality of weaving machines. Accordingly, by adding the data of a plurality of weaving machines together, the obtained result is substantially similar to that obtained in the case where the trial running time is made long, though the trial running time of the individual weaving machine is short, so that the quantity of production is increased.

When the number of times of stop of the weaving machine during the trial running is counted, and the count value exceeds a predetermined value or is expected to be in excess of a predetermined value, the trial rotational frequency is preferably varied. Thus, it is possible to prevent the quality of woven fabric during the trial running from being degraded. Further, since the rotational frequency insufficient to cover the reference number of times of stop of the weaving machine is distant from the optimum rotational frequency, the certainty of the optimum rotational frequency obtained by using data obtained under such condition is small. On the contrary, if the rotational frequency in the trial running is varied as noted above, the trial running is performed at the rotational frequency satisfying the reference number of times of stop of the weaving machine, so that the certainty of the obtained optimum rotational frequency is improved.

BRIEF DESCRIPTION OF THE DRAWINGS

The foregoing and other objects and features of the invention will become apparent from the following description of preferred embodiments of the invention with reference to the accompanying drawings, in which:

FIG. 5 is a flow chart explaining the operation of a rotational frequency controller;

FIG. 8 is a graph for explaining the weighting used for the calculation of the estimated stop time or the like.

DETAILED DESCRIPTION OF THE PREFERRED EMBODIMENTS

Figure 1:
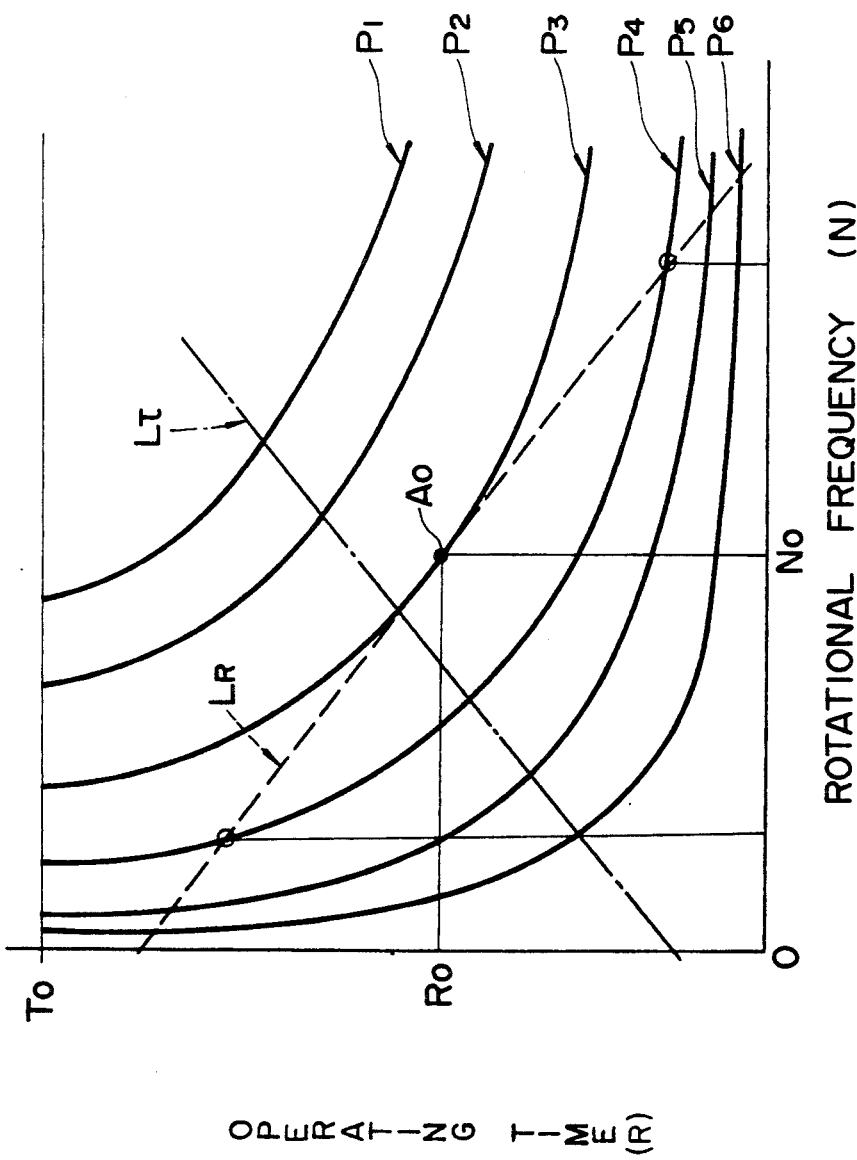
FIG. 1 is a graph for explaining a principle underlying the present invention.
Figure 2:
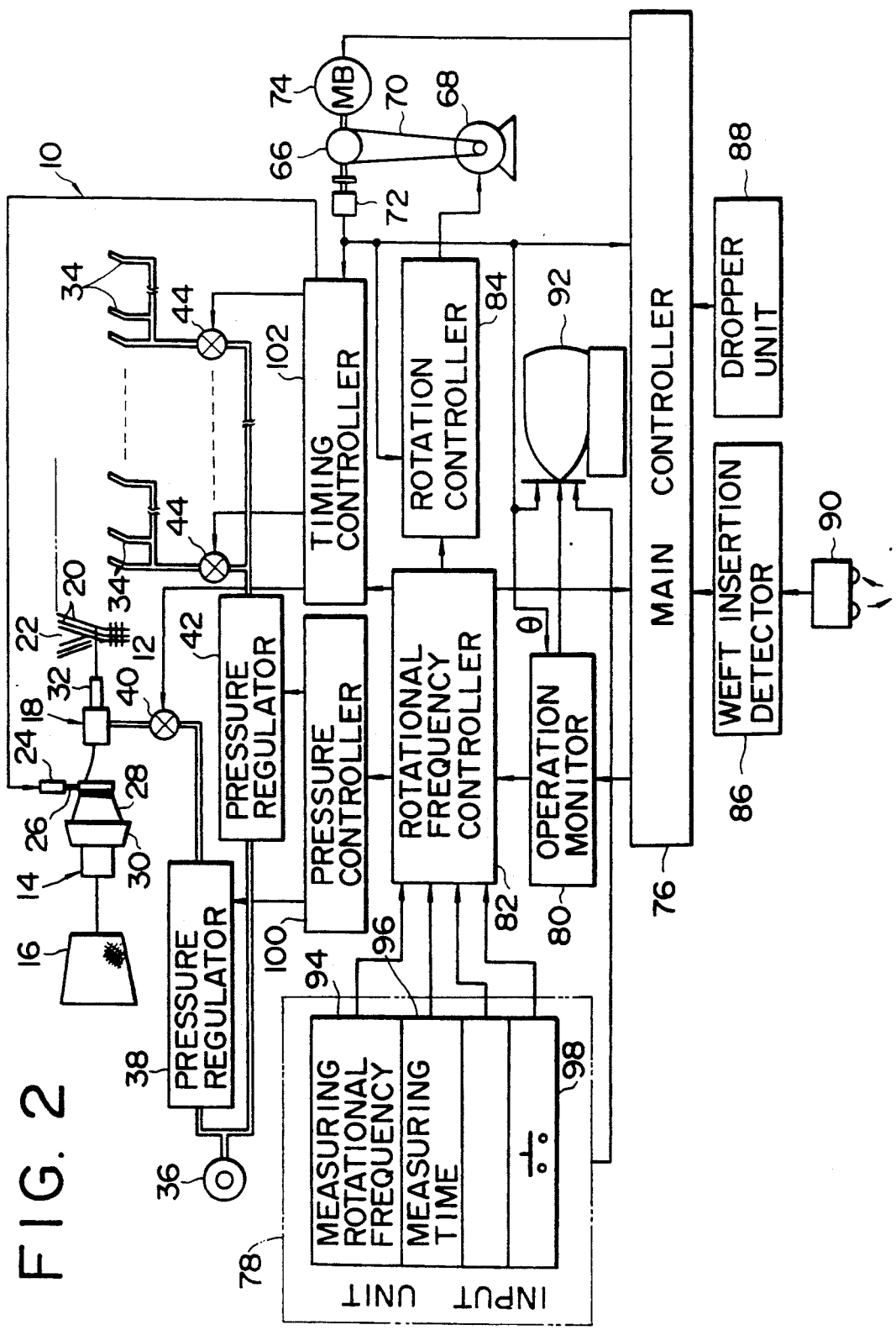
FIG. 2 is a view diagrammatically showing an embodiment of a weaving machine provided with a control apparatus according to the present invention.

With reference to FIG. 2, a weaving machine 10 includes a rotary length-measuring storage unit 14 for weft 12. The weft 12 is rolled around a supply bobbin 16. The weft 12 is fed from the supply bobbin 16 to a well-known weft inserting unit 18 through the length-measuring storage unit 14 and is inserted into a shed 22 of warp 20 by the weft inserting unit 18.

When the weft insertion is not done, the weft 12 is engaged with a pin 26 operated by a solenoid 24 to prevent the weft 12 from being released from the outer peripheral surface of a drum 28 used both for length-measurement and for storage. Also, the weft 12 is rolled around the outer peripheral surface of the drum 28 by a predetermined length with the rotation of a yarn guide 30.

When the weft insertion is done, the weft 12 is released from the pin 26, and, together with fluid, is jetted from a main nozzle 32 of the weft inserting unit 18 for insertion into the shed 22 of the warp 20. The weft inserting unit 18 includes a plurality of sub nozzles 34 jetting fluid for putting the weft 12 in a predetermined direction during the weft insertion.

Working fluid from a pressure source 36 is supplied to the main nozzle 32 through a pressure regulator 38 and a switch valve 40. The working fluid of the pressure source 36 is supplied to each sub nozzle 34 through a pressure regulator 42 and a switch valve 44.

Figure 3:
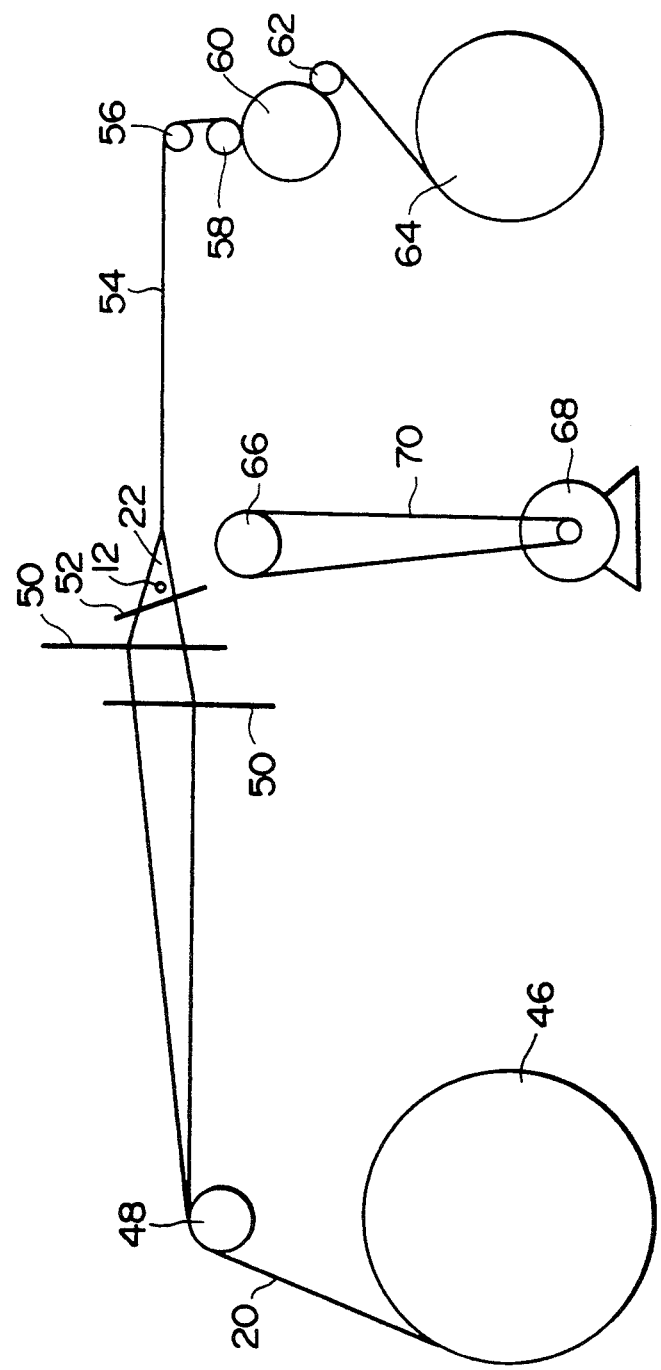
FIG. 3 is a schematic view showing a route of warp of the weaving machine shown in FIG. 2.

As shown in FIG. 3, each warp 20 is rolled around a letting-off beam 46. The warp 20 from the letting-off beam 46 is fed to a weaving section through a tension roller 48. In the weaving section, the shed 22 of the warp 20 is formed by a plurality of healds 50. The weft 12 is inserted into the shed 22, and is beat up against a cloth fell by a reed 52 to be woven into a fabric 54. The woven fabric 54 is rolled around a take-up beam 64 through a presto beam 56, a guide roller 58, a take-up roller 60 and a guide roller 62.

As shown in FIGS. 2 and 3, the weaving machine 10 further includes a motor 68 for a main shaft 66 for operating the reed 52. The rotation of the motor 68 is transmitted to the main shaft 66 through a connecting mechanism 70. The main shaft 66 is connected to an encoder 72 for generating a rotational angle signal corresponding to the rotational angle of the main shaft, and a solenoid operated brake 74 for the main shaft 66. The length-measuring storage unit 14, the weft inserting unit 18, the letting-off beam 46, the healds 50, the reed 52 and the take-up roller 60 are operated in synchronism with the rotation of the main shaft 66.

As shown in FIG. 2, an apparatus for controlling the weaving machine 10 comprises a main controller 76, an input unit 78 for setting the rotational frequency in a trial running and the trial running time, a rotational frequency controller 82 for calculating, or computing, the optimum rotational frequency of the weaving machine on the basis of data set in the input unit 78 and a signal supplied from an operation monitor 80, and a rotation controller 84 for rotating the motor 68 at the predetermined rotational frequency on the basis of an output signal of the rotational frequency controller 82.

The main controller 76 receives an output signal of a well-known weft insertion detector 86 for generating a weft stop signal representing that weft insertion is not done, an output signal of a well-known dropper unit 88 for generating a warp stop signal representing that the warp 20 is subjected to end breakage, an output signal of the encoder 72, and an output signal of the rotational frequency controller 82. The weft insertion detector 86 generates a predetermined electric signal on the basis of an output signal of a well-known weft sensor 90 for generating an electric signal corresponding to the presence or absence of the weft 12.

The main controller 76 executes, on the basis of the respective input signals and control information stored in an internal memory, the sequence control necessary for various controls of the length measurement of the weft 12, the storage and insertion of the weft 12, the letting-off motion of the warp 20, the operation of the heald 50, the take-up motion of the woven fabric 54 and the starting and stopping operations of various units constituting the weaving machine. Also, the main controller 76 outputs, to the operation monitor 80, a running signal representing that whether or not the weaving machine 10 is in a running condition.

The operation monitor 80 calculates the quantity of produced woven fabric 54, the weft stop level caused by the stop of the weft 12, the warp stop level caused by the stop of the warp 20, the weaving machine stop level serving as the total stop level of the whole weaving machine, the total stop frequency of the weaving machine, the total stop time of the weaving machine, the operating time defined as the total time in which the fabric is actually woven, the running time defined as the sum of the total stop time and the operating time and the operating rate of the weaving machine on the basis of the rotational angle signal supplied from the encoder 72 and the weft stop signal, the warp stop signal and the weaving machine running signal supplied from the main controller 76, whereby the above-mentioned calculated data is supplied to the rotational frequency controller 82 and a display monitor 92. Each of the weft stop level, the warp stop level and the weaving machine stop level is defined as the total stop frequency per unit production quantity of the woven fabric.

The input unit 78 is provided with a plurality of pairs of setters 94, 96 for respectively setting the trial running time, or measuring time, and the trial rotational frequency, or measuring rotational frequency, and a pushbutton switch 98 for inputting a trial running start command to the rotational frequency controller 82. Values set in the respective setters 94, 96 are supplied to the rotational frequency controller 82 and the display monitor 92.

The rotational frequency controller 82 calculates, or computes, the rotational frequency of the weaving machine on the basis of each data supplied from the operation monitor 80 and the input unit 78, and then outputs a signal corresponding to the calculated rotational frequency of the weaving machine to a pressure controller 100 and a timing controller 102.

The pressure controller 100 controls the pressure regulators 38, 42 on the basis of a signal supplied from the rotational frequency controller 82 so as to regulate the pressure of working fluid supplied from the pressure source 36 to the main nozzle 32 and each sub nozzle 34 of the weft inserting unit 18. The timing controller 102 controls the solenoid 24 on the basis of the signal supplied from the rotational frequency controller 82 so as to regulate the switch valves 40, 44 for the working fluid.

Figure 4A:
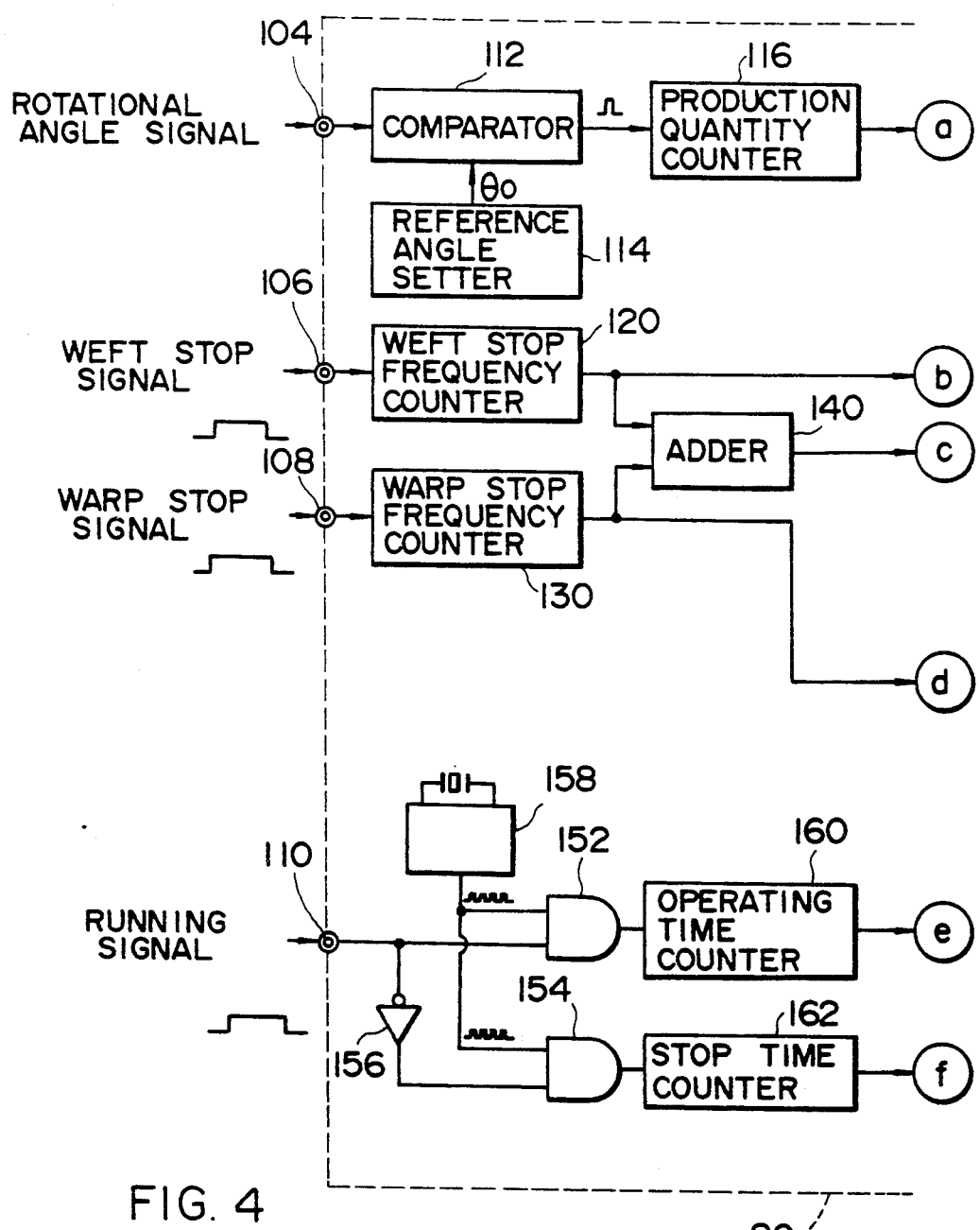
FIGS. 4A and 4B provide a circuit diagram showing an embodiment of an operation monitor for use in the weaving machine shown in FIG. 2.
Figure 4:
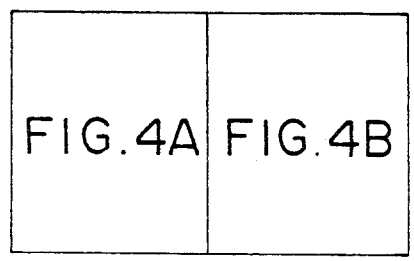

As shown in FIGS. 4A and 4B, the operation monitor 80 for generating various information has terminals 104, 106, 108 and 110 for respectively receiving the main shaft rotational angle signal supplied from the encoder 72 as well as the weft stop signal, the warp stop signal and the weaving machine running signal supplied from the main controller 76.

The rotational angle signal is supplied to a comparator 112. In the comparator 112, the rotational angle signal is compared with a reference angle $\theta_0$, i.e., 0 degree set in a reference angle setter 114. The comparator 112 outputs a pulse signal when the rotational angle signal is considered to be the reference angle $\theta_0$. This pulse signal is counted in a counter 116. Since the pulse signal is output every time the rotational angle signal comes to a predetermined value, the count value of the counter 116 is output from a terminal 118 as information representing the quantity of production.

The weft stop signal is supplied to a counter 120 for obtaining the stop frequency caused by the weft. The count value of the counter 120 is supplied to a divider 122 as a signal representing the weft stop frequency. In the divider 122, the count value of the counter 120 is divided by a value corresponding to the quantity of production supplied from the counter 116. An output signal of the divider 122 is multiplied in a multiplier 124 by a value set in a setter 126 so as to obtain the weft stop frequency per unit production quantity (for instance, one hundred thousand picks). The resultant output signal of the multiplier 124 is output from a terminal 128 as information representing the weft stop level.

The warp stop signal is supplied to a counter 130 for obtaining the stop frequency caused by the warp. The count value of the counter 130 is supplied to a divider 132 as a signal representing the warp stop frequency. In the divider 132, the count value of the counter 130 is divided by the value corresponding to the quantity of production supplied from the counter 116. An output signal of the divider 132 is multiplied in a multiplier 134 by a value set in a setter 136 so as to obtain the warp stop frequency per production quantity (for instance, one hundred thousand picks). The resultant output signal of the multiplier 134 is output from a terminal 138 as information representing the warp stop level.

The count values of the counters 120 and 130 are added by an adder 140 for obtaining the machine stop frequency caused by the weft and warp. A value provided from the adder 140 is output from a terminal 142 as information representing the machine stop frequency.

The value output from the adder 140 is also supplied to a divider 144. In the divider 144, the output value from the adder 140 is divided by the value corresponding to the quantity of production supplied from the counter 116. A value output from the divider 144 is multiplied in a multiplier 146 by a value set in a setter 148 so as to obtain the weaving machine stop level per unit production quantity (for instance, one hundred thousand picks). The resultant output value of the multiplier 146 is output from a terminal 150 as information representing the weaving machine stop level caused by the weft and warp.

The running signal is supplied to one input terminal of AND gate 152 having two input terminals, and also to one input terminal of another AND gate 154 having two input terminals through an inverter 156. A clock signal of a fixed frequency is supplied from an oscillator 158 to the other input terminal of the AND gate 152 and that of the AND gate 154. An output signal of the AND gate 152 and that of the AND gate 154 are counted respectively by counters 160 and 162.

Since the AND gate 152 is opened only when the weaving machine is in an operated condition, the count value of the counter 160 represents the actual running time, i.e., the operating time of the weaving machine. On the other hand, the count value of the counter 162 represents the total stop time of the weaving machine since the AND gate 154 is opened only when the weaving machine is not in an operated condition. The count value of the counter 160 and that of the counter 162 are respectively output from terminals 164 and 166.

The count value of the counter 160 and that of the counter 162 are added by an adder 168 to thereafter be supplied to a divider 170. In the divider 170, the count value of the counter 160 is divided by a value supplied from the adder 168 so as to obtain the operating rate, and thereafter the resultant value is multiplied in a multiplier 172 by a fixed value (one hundred) set in a setter 174. An output signal of the multiplier 172 is output from a terminal 176 as information representing the operating rate.

An output signal of the adder 168 is also output from a terminal 178 as information representing the running time, which is defined as the sum of the operating time and the total stop time.

Each information obtained at the terminals 118, 128, 138, 142, 150, 164, 166, 176 and 178 is supplied to the rotational frequency controller 82, and also displayed on the display monitor 92.

The value set in each of the setters 126, 136 and 148 may be defined as one hundred thousand, for example. The value set in the setter 174 is defined as one hundred.

The weft stop level, the warp stop level and the machine stop level may be defined as the corresponding stop frequency per unit length of the woven fabric, per unit running time or per unit operating time.

Next will be explained the operation of the rotational frequency controller 82 with reference to FIG. 5.

If the switch 98 is operated, the rotational frequency controller 82 executes the steps of reading a plurality of measuring rotational frequencies and a plurality of measuring times respectively set in the setters 94 and 96, varying the rotational frequency of the weaving machine into one of the read-in measuring rotational frequencies, determining whether or not the running time supplied from the operation monitor 80 reaches the read-in measuring time, and then storing the rotational frequency N and the operating time R in a memory when the running time reaches a predetermined value. The above-mentioned steps are performed for each of the read-in measuring rotational frequencies (Steps (1) through (4)).

Thus, a plurality of trial runnings are performed at different trial rotational frequencies to obtain the operating time and the rotational frequency for each trial running. Instead of the operating time, the actual operating time in the trial running, or the operating time per unit time (for instance, one shift time) obtained on the basis of the trial operating time may be utilized. Respective trial running times are preferably made constant, while it may be varied for each trial running.

Next, the rotational frequency controller 82 executes, for each trial running, the computation of the function $R = f(N)$, for example, the formula (5) representing the relation between the operating time factor and the rotational frequency factor on the basis of one shift time $T_0$ as well as each obtained rotational frequency and each obtained operating time. This computation is performed by calculating the indefinite coefficients "a" and "b" by means of substituting one shift time $T_0$ as well as the operating time and the rotational frequency for each trial running for the formula (5), or by means of regression analysis such as a least squares method.

Then, the rotational frequency controller 82 executes the computation of the formula (9) by using the calculated indefinite coefficients "a" and "b" to obtain the optimum rotational frequency (Step (6)), and then varies the rotational frequency of the weaving machine 10 into the obtained optimum rotational frequency (Step (7)).

When the weaving machine 10 is operated at the optimum rotational frequency obtained as noted above, the maximum quantity of production is obtained since the optimum rotational frequency is defined as the rotational frequency corresponding to a point of contact of a curve representing the relation among the quantity of production P, the rotational frequency N and the operating time R with a line corresponding to the formula i.e., the function $R = f(N)$ representing the relation between the rotational frequency N and the operating time R, Preferably, each of above-mentioned trial runnings is simultaneously performed relative to a plurality of weaving machines for weaving the same scaled product, and the product of the operating time for each of the trial rotational frequencies and the number of the machines is obtained as the total operating time of a plurality of weaving machines.

Between the steps (1) and (2), when the machine stop frequency exceeds a predetermined value, the rotational frequency in the trial running may be reduced. In this case, new data representing the new trial rotational frequency may be added to old data representing the old trial rotational frequency. However old data up to the time when the total stop frequency exceeds a predetermined value is preferably cancelled to obtain new data based on the new trial rotational frequency.

Next will be explained an embodiment of the method for determining the rotational frequency in the trial running according to the fuzzy inference by using the operating time R and the stop frequency n at present.

Figure 6A:
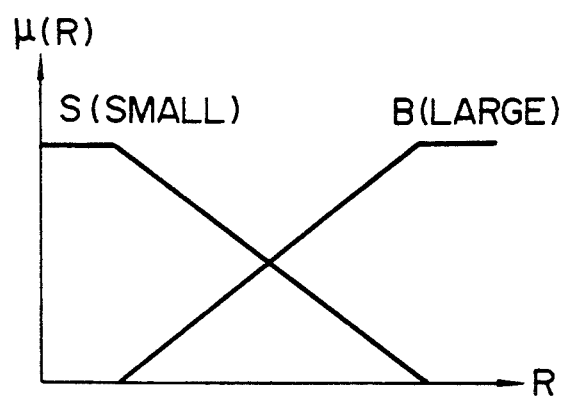
FIGS. 6A, 6B and 6C are graphs showing an embodiment of the membership functions used for the rotational frequency controller provided with a fuzzy inferring function.
Figure 6B:
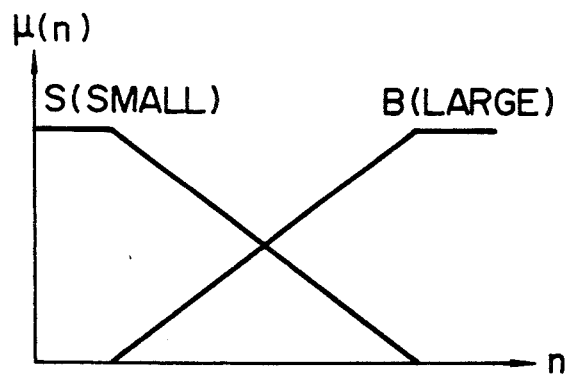
Figure 6C:
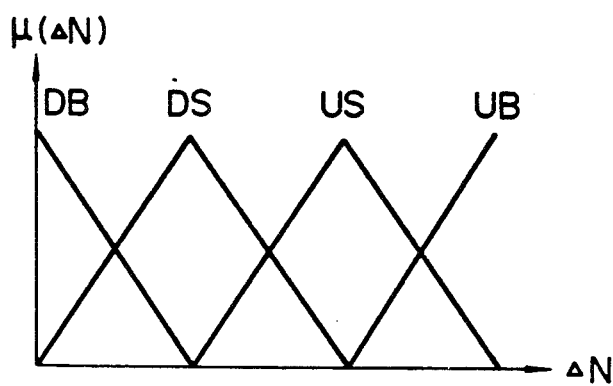

The rotational frequency controller 82 provided with a fuzzy inferring function includes a memory, in which membership functions shown in FIGS. 6(A) through 6(C) and a plurality of fuzzy rules (not shown) are stored.

The membership functions B and S shown in FIG. 6(A) are respectively defined as the functions corresponding to the respective languages representing that, or to the effect that, "The operating time R is large" and "The operating time R is small", and also represent the certainty, in which the operating time R belongs to the corresponding language. The membership functions B and S shown in FIG. 6(B) are respectively defined as the functions corresponding to the respective languages representing that "The stop frequency n is large" and "The stop frequency n is small", and also represent the certainty, in which the stop frequency n belongs to the corresponding language. The respective membership functions shown in FIGS. 6(A) and 6(B) are used for the inference representing that how much the corresponding language matches with the antecedent of each fuzzy rule, which will be later described, i.e., the matching inference.

The membership functions UB, US, DS and DB shown in FIG. 6(C) are respectively defined as the functions corresponding to the respective languages representing that "Increase the rotational frequency", "Slightly increase the rotational frequency", "Slightly reduce the rotational frequency" and "Reduce the rotational frequency", and also represent the certainty, in which the rotational frequency to be varied belongs to the corresponding language. These membership functions UB, US, DS and DB are used when inferring the consequent of each fuzzy rule on the basis of the above matching.

The fuzzy rules $R_1$ through $R_4$ stored in the rotational frequency controller 82 are respectively as follows:

$R_1$: If the operating time R is large, and the stop frequency (n) is small, then increase the rotational frequency (UB).

$R_2$: If the operating time R is large, and the stop frequency (n) is large, then slightly increase the rotational frequency (US).

$R_3$: If the operating time R is small, and the stop frequency (n) is small, then slightly reduce the rotational frequency (DS).

$R_4$: If the operating time R is small, and the stop frequency (n) is large, then reduce the rotational frequency (DB).

The rotational frequency controller 82 using the above-mentioned respective membership functions and fuzzy rules receives the operating time R and the stop frequency n at present in response to the operation of the switch 98, and thereafter obtains the degree of matching of the operating time R and the stop frequency n with respect to the membership function corresponding to the language of the antecedent of each of the fuzzy rules $R_1$ through $R_4$, i.e., the degree of matching for each fuzzy rule.

Next, by utilizing the obtained degree of matching for each fuzzy rule, the rotational frequency controller 82 infers the degree of matching for the membership function corresponding to the language of the consequent of each of the fuzzy rules $R_1$ through $R_4$ for each fuzzy rule and obtains the composite membership function by means of superposition of the result of inference. Then, the rotational frequency controller 82 obtains a value of the center of mass of the obtained composite membership function to thereafter obtain the rotational frequency factor $\Delta N$ to be varied, and then varies the rotational frequency of the weaving machine 10 into a value corresponding to the sum of the obtained rotational frequency factor $\Delta N$ and the present rotational frequency N to perform the next trial running.

Also in the subsequent trial running, the rotational frequency controller 82 obtains the rotational frequency factor $\Delta N$ to be varied similarly to the way as noted above, and thereafter varies the rotational frequency of the weaving machine 10 into the value corresponding to the sum of the obtained rotational frequency factor $\Delta N$ and the present rotational frequency N to perform the next trial running.

The rotational frequency in the trial running may be determined by the fuzzy inference, instead of only the present operating time and the present stop frequency, by making use of another data such as the estimated total stop frequency, the estimated quantity of production, a difference $\Delta n$ between the estimated total stop frequency and a reference value and a difference $\Delta p$ between the estimated quantity of production and a reference value.

When the fuzzy inference is performed by using $\Delta n$ and $\Delta p$, the membership functions similar to those shown in FIGS. 6(A) and 6(B) can be used as the membership functions corresponding to the respective languages representing that "Each of $\Delta n$ and $\Delta p$ is large" and "Each of $\Delta n$ and $\Delta p$ is small", and also the membership functions similar to those shown in FIG. 6(C) can be used as the membership functions corresponding to the respective languages representing that "Increase the rotational frequency", "Slightly increase the rotational frequency", "Slightly reduce the rotational frequency" and "Reduce the rotational frequency". Further, the fuzzy rules utilizing $\Delta n$ and $\Delta p$ can be stored as follows:

$R_1$: If $\Delta n$ is negative, and $\Delta p$ is positive, then increase the rotational frequency.

$R_2$: If both of $\Delta n$ and $\Delta p$ are negative, then slightly increase the rotational frequency.

$R_3$: If both of $\Delta n$ and $\Delta p$ are positive, then slightly reduce the rotational frequency.

$R_4$: If $\Delta n$ is positive, and $\Delta p$ is negative, then reduce the rotational frequency.

The estimated machine stop frequency and the estimated quantity of production can be calculated on the basis of the machine stop frequency up to now, the quantity of production up to now, the elapsed time up to now, the operating time up to now and the shift time or the like. The operation of calculating the estimated machine stop frequency and the estimated quantity of production is executed by the rotational frequency controller 82. Also, the method of the fuzzy inference is not limited to the above, while the fuzzy inference may be made by another method well known per se.

Figure 7B:
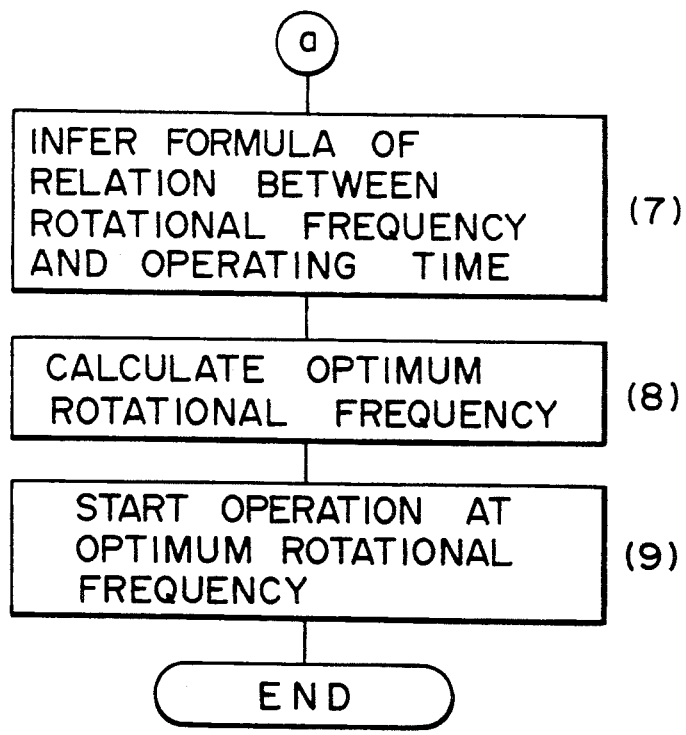
FIGS. 7A and 7B provide a flow chart for explaining another operation of the rotational frequency controller.
Figure 7:
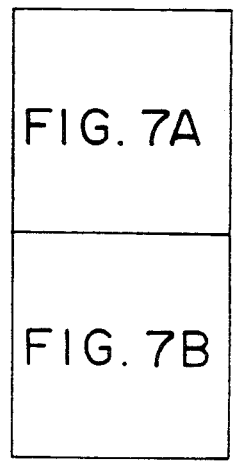

With reference to FIG. 7, next will be explained an embodiment of the method for estimating the machine stop frequency and operating time per unit time (for instance, one shift time), and then calculating the optimum rotational frequency, at which the quantity of production reaches the maximum, by utilizing the estimated rotational frequency and operating time during the trial running.

In response to the operation of the switch 98, the rotational frequency controller 82 first varies the trial rotational frequency to the initial value set at the setter 94, as mentioned above, then estimates the stop frequency per one shift time every time the apparatus stops in the trial operation, and determines whether or not the estimated stop frequency exceeds a reference value. (Steps 2 and 3)

When the estimated trial stop frequency does not exceed the reference value, the rotational frequency controller 82 repeats the steps 2 and 3 until a predetermined measuring time set at the setter 96 elapses in the trial running. (Step 4)

When the estimated stop frequency exceeds the reference value or when a predetermined period of time elapses in the trial running, the rotational frequency controller 82 estimates a stop frequency and an operating time per one shift time, and then stores the rotational frequency and the estimated operating time at that time in a memory. (Step 5)

Next, the rotational frequency controller 82 obtains the next trial rotational frequency by the fuzzy inference according to these estimated stop frequency and estimated operating time (Step 1), and executes the next trial running.

Thus, by repeating the steps 1 through 5 a predetermined number of times, the rotational frequency controller 82 obtains an estimated operating time corresponding to each trial rotational frequency.

When the number of the data reaches a predetermined number, the repetition of the steps 1 through 5 is stopped (Step 6), and the rotational frequency controller 82 infers the function, $R = f(N)$, for example, the formula (5) representing the relation between the operating time factor and the rotational frequency factor, on the basis of the obtained estimated operating time and rotational frequency for each trial running as well as one shift time $T_0$ (Step 7). This inference can be performed by solving as simultaneous equations a plurality of formulae obtained, by substituting the operating time and the rotational frequency for each trial running into the formula (5), or by calculating the indefinite coefficients "a" and "b" through regression analysis such as a least squares method.

Next, the rotational frequency controller 82 executes the computation of the formula (9) by using the calculated indefinite coefficients "a" and "b" to obtain the optimum rotational frequency (Step (8)), and then varies the rotational frequency of the weaving machine 10 into the obtained optimum rotational frequency (Step (9)).

If the optimum rotational frequency is obtained as noted above, even when the trial running is made short, substantially the same result can be obtained as when the actual trial running is made long, so that the quantity of production is increased.

The estimated stop frequency, the estimated total stop time and the estimated operating time are calculated as follows.

Now, supposing $(N+\Delta N)$ = the measured rotational frequency t = the elapsed time from the start of measurement
i = the stop frequency measured from the start of measurement till the time t elapses
$\hat{n}$ = the stop frequency estimated to be measured from the start of measurement till the unit time $T_0$ elapses
$\tau_j$ = the stop time from the start of measurement to the j-th stop
$\bar{\tau}$ = the average stop time per one stop measured from the start of measurement till the time t elapses,
the number of stops to be measured is considered to be proportionate to the measured time. Thus, $$\hat{n} = n + \Delta\hat{n} = (T_0/t)i \quad (10)$$

The estimated stop frequency in the unit time $T_0$ can be obtained from the formula (10) in the elapsed time t before the lapse of the unit time $T_0$, since it is equal to the stop frequency $\hat{n}$ estimated to be measured from the start of measurement till the unit time $T_0$ elapses.

$$\bar{\tau} = (1/i) \sum_{j=1}^{i} \tau_j$$

Further, if the average stop time per one stop is constant in any of the time t and the time $T_0$, the estimated average stop time $\hat{\tau}$ is equal to the average stop time $\bar{\tau}$, i.e., $$\hat{\tau} = \bar{\tau}.$$

Accordingly, if T' = the estimated stop time in the time $T_0$;

$$\hat{T} = \hat{n} \cdot \hat{\tau} \quad (11)$$
$$= (T_0/t)i \cdot (1/i) \sum_{j=1}^{i} \tau_j$$
$$= (T_0/t) \sum_{j=1}^{i} \tau_j$$

whereby the estimated stop time in the time $T_0$ is obtained according to the formula (11) in the time t before the lapse of the time $T_0$. Also, the estimated operating time in the time $T_0$ is defined as a value resulting from subtracting the estimated stop time from the time $T_0$, so that the estimated operating time in the time $T_0$ is obtained in the time t before the lapse of the time $T_0$.

If the estimated stop frequency, the estimated stop time and the estimated operating time are determined when the elapsed time t is short, the obtained value, i.e., the certainly of the estimated value is smaller than when the elapsed time t is long. Therefore, it is preferable that the estimated stop frequency, the estimated stop time and the estimated operating time are determined when the certainty of the estimated value is large.

Figure 8:
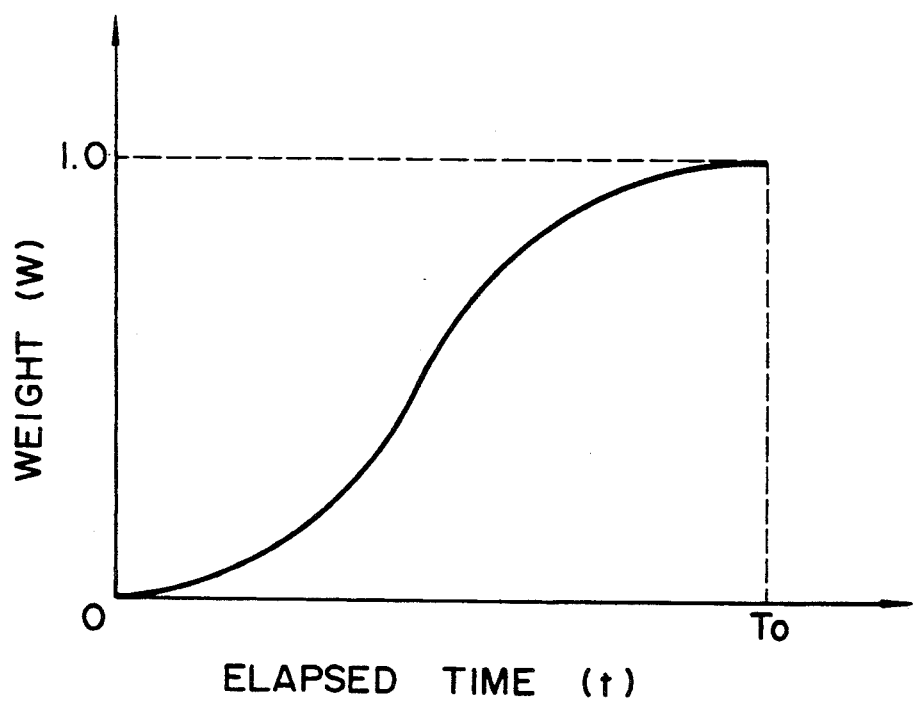

Further, the estimated stop frequency $\hat{n}'$ in the unit time $T_0$, the estimated stop time and the estimated operating time can be determined by providing a weight w as shown in FIG. 8 to the elapsed time t. The estimated stop frequency $\hat{n}'$ in the unit time $T_0$, and the estimated average stop time $\hat{\tau}'$ per one stop in consideration of the weight w of the elapsed time can be expressed as follows:

$$\hat{n}' = n + w(\hat{n} - n) = n(1 - w) + w(T_0/t)i$$
$$\hat{\tau}' = \bar{\tau}N + w(\hat{\tau} - \bar{\tau}N) = \bar{\tau}N(1 - w) + w(1/i) \sum_{j=1}^{i} \tau_j$$

wherein
n = the number of stop in the unit time $T_0$ when the rotational frequency is N
$\bar{\tau}N$ = the average stop time per one stop when the rotational frequency is N.
whereby the final estimated stop time T can be obtained as follows:

$$\hat{T} = \hat{n}' \cdot \hat{\tau}'.$$

What is claimed is:
1. A method for controlling the rotational frequency of a weaving machine, comprising the steps of:
    performing a plurality of trial runnings of the weaving machine at different trial rotational frequencies to obtain the operating time for each trail rotational frequency;

obtaining at least one indefinite coefficient in a formula representing the relation between a rotational frequency factor and an operating time factor by a computer on the basis of each obtained operating time and each trail rotational frequency;

obtaining by said computer the optimum rotational frequency, at which the quantity of production reaches the maximum, on the basis of the obtained at least one indefinite coefficient; and controlling the rotational frequency of the weaving machine into the obtained optimum rotational frequency;

wherein the step of obtaining the operating time for each rotational frequency includes the step of determining by said computer through fuzzy inference the rotational frequency at a trial running time on the basis of the weaving machine operating information during at least a previous trial running time.

2. A method according to claim 1, wherein each of said operating times is defined as the estimated operating time per unit time after the trail running is performed for a predetermined period of time.

3. A method according to claim 1, wherein each of said operating times is obtained as the total operating time of a plurality of weaving machines for weaving the same scaled product by simultaneously performing the trial runnings of weaving machines.

4. A method according to claim 1, further comprising the step of counting the number of times of stop of the weaving machine during the trial running to vary said trial rotational frequency when the count value exceeds a predetermined value or when said count value is expected to be in excess of said predetermined value.

5. An apparatus for controlling the rotational frequency of a weaving machine, comprising:

control means for controlling the weaving machine to perform a plurality of trial runnings at different trial rotational frequencies; and computing means for obtaining the operating time for each trial rotational frequency, then obtaining at least one indefinite coefficient in a formula representing the relation between a rotational frequency factor and an operating time factor on the basis of each obtained operating time and each trial rotational frequency to obtain the optimum rotational frequency, at which the quantity of production reaches the maximum, on the basis of the obtained indefinite coefficient;

wherein said control means further controls the rotational frequency of the weaving machine into the obtained optimum rotational frequency; and wherein said computing means determines through fuzzy inference the rotational frequency at a trial running time on the basis of the weaving machine operating information during at least a previous trial running time.

6. An apparatus according to claim 5, wherein said computing means includes a controller, in which a plurality of membership functions and a plurality of fuzzy rules are stored, said controller being adapted to determine said optimum rotational frequency by utilizing the fuzzy inference using said membership functions and said fuzzy rules.

7. A method for controlling the rotational frequency of a weaving machine, comprising the steps of:

performing a plurality of trial runnings of the weaving machine at different trial rotational frequencies to obtain the operating time for each trial rotational frequency by computer;

obtaining by said computer on the basis of each obtained operating time and each trail rotational frequency at least one indefinite coefficient in a formula representing the relation between a rotational frequency factor and an operating time factor;

obtaining the rotational frequency of the weaving machine at a time when a hyperbolic graphical plot representing the quantity of production P, the rotational frequency N and the operating time R respectively of the weaving machine contacts a line representing said formula including the obtained indefinite coefficient; and controlling the actual rotational frequency of the weaving machine into the obtained rotational frequency;

wherein the step of obtaining said operating time for each rotational frequency includes the step of determining the rotational frequency at a trial running on the basis of a plurality of membership functions and a plurality of fuzzy control rules and through the fuzzy inference to adapt the weaving machine operating information from at least the previous trial running into the antecedent of said fuzzy control rules.

8. An apparatus for controlling the rotational frequency of a weaving machine, comprising:

control means for controlling the weaving machine to perform a plurality of trial runnings at different trial rotational frequencies;

and computing means for obtaining the operating time for each trial rotational frequency, then obtaining at least one indefinite coefficient in the formula representing the relation between a rotational frequency factor and an operating time factor on the basis of each obtained operating time and each trial rotational frequency and the rotational frequency of the weaving machine at the time when a hyperbola representing the quantity of production P, the rotational frequency N and the operating time R respectively of the weaving machine contacts a line representing said formula including the obtained indefinite coefficient;

wherein said control means further controls the actual rotational frequency of the weaving machine into the obtained rotational frequency; and wherein said computing means determines the rotational frequency at a trial running on the basis of a plurality of membership functions and a plurality of fuzzy control rules and through fuzzy inference to adapt the weaving machine operating information from at least the previous trial running into the antecedent of said fuzzy control rules.

* * * * *